US006128808A

United States Patent [19]

Jansson et al.

[11] Patent Number: 6,128,808

[45] Date of Patent: Oct. 10, 2000

[54] TOOL HANDLE

[75] Inventors: Conny Jansson, Enköping; Hans Himbert; Håkan Bergkvist, both of Bromma, all of Sweden

[73] Assignee: Sandvik AB, Sandviken, Sweden

[21] Appl. No.: 09/142,611

[22] PCT Filed: Mar. 12, 1997

[86] PCT No.: PCT/SE97/00423

§ 371 Date: Dec. 7, 1998

§ 102(e) Date: Dec. 7, 1998

[87] PCT Pub. No.: WO97/33724

PCT Pub. Date: Sep. 18, 1997

[30] Foreign Application Priority Data

Mar. 15, 1996 [SE] Sweden .................................. 9600986

[51] Int. Cl.[7] ................................ A47J 45/00; E05B 1/00

[52] U.S. Cl. ................................ 16/431; 16/421; 16/902; 16/DIG. 12

[58] Field of Search .............................. 16/430, 431, 436, 16/902, 421, DIG. 12, DIG. 18, DIG. 19; 81/489, 436, 177.1, DIG. 5

[56] References Cited

U.S. PATENT DOCUMENTS

| | | | |
|---|---|---|---|
| 490,459 | 1/1893 | Straus | 16/421 |
| 4,416,166 | 11/1983 | Jannard et al. | 16/421 |
| 5,097,566 | 3/1992 | Decker et al. . | |
| 5,261,665 | 11/1993 | Downey | 16/DIG. 12 |
| 5,530,989 | 7/1996 | Remmert et al. | 16/430 |

FOREIGN PATENT DOCUMENTS

| | | |
|---|---|---|
| 25 14 119 | 7/1976 | Germany . |
| 36 22 596 | 1/1993 | Germany . |
| 42 19 253 | 12/1993 | Germany . |
| 43 43 650 | 6/1995 | Germany . |

*Primary Examiner*—Chuck Y. Mah
*Attorney, Agent, or Firm*—Burns, Doane, Swecker & Mathis, L.L.P.

[57] ABSTRACT

Handle for tools such as screwdrivers, cormprising a core of hard plastic material around a metal shaft and a gripping surface (14) of soft material covering parts of the core, where the core within the regions covered by the gripping surface is made with a multitude of protruding lower blocks (17) with flat tops, and the soft material filling the space between lower blocks to the level of the tops of lower blocks (17) to form base surface (16) and a multitude of blocks (15) raised from the base surface, arranged in a repetitive pattern with voids where the lower blocks protrude.

6 Claims, 1 Drawing Sheet

TOOL HANDLE

BACKGROUND

It is previously known, as by patents DE 42 19253 and DE 43 43650, to make handles for screwdrivers or similar tools from several materials with different hardness. A hard material is then chosen as an inner core to ensure a safe transmission of force and torque to the metal shaft of the tool, and a soft material with high friction is preferred for the outer layer in contact with the hand. The parts from different materials can either be separately manufactured and joined in a second step as in DE 43 43650, or cast together in a two step injection moulding as in DE 42 19253.

To aim and use the tool with precision, the hand must feel the resistance from the workpiece against the metal tip of the tool. This requires that the soft material has small thickness and a suitable surface structure. The boundary surface between the materials is then a critical area, which must be made with ribs or indentations to withstand force and torque, since the deformation properties for soft and hard materials are so different, that the soft layer would otherwise easily crumple and loosen, especially if the layer is thin.

The invention concerns a handle with a handgrip structure combining the high friction of a soft material, a surface structure and small thickness allowing accurate feeling of the workpiece resistance and a hard inner core with high strength.

DESCRIPTION

The invention is described with reference to the figures, where

Figure 1:
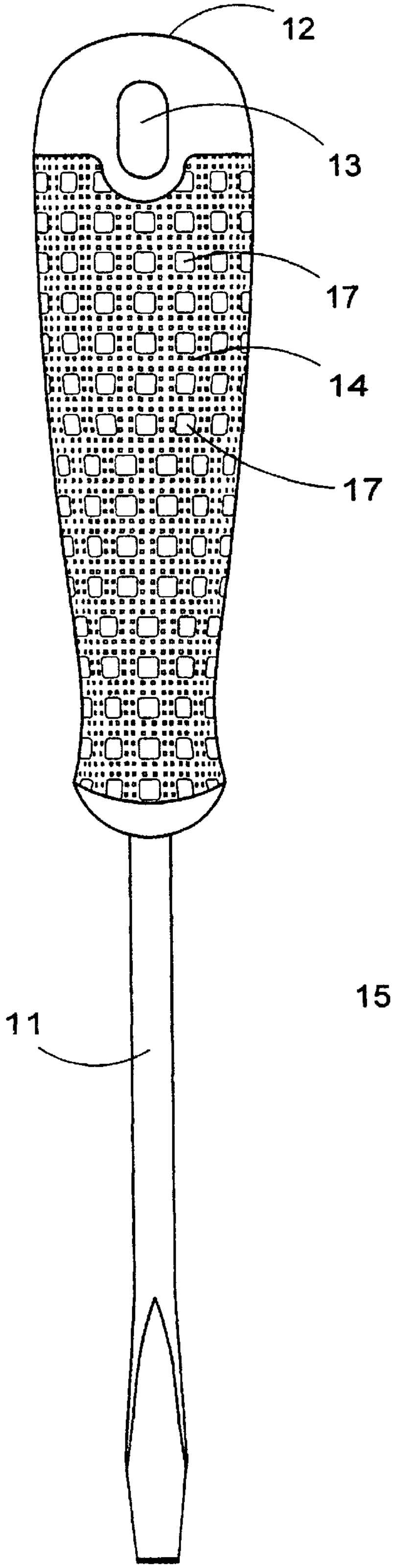
Figure 2:
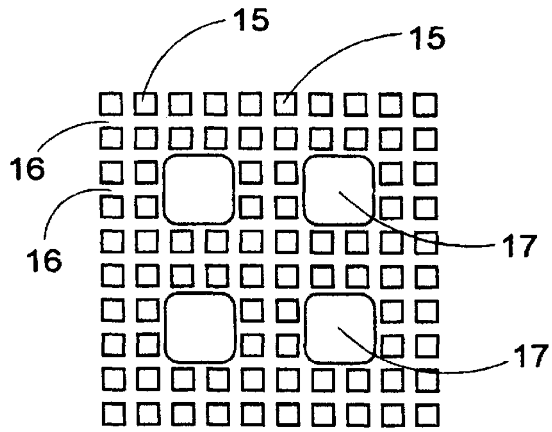
Figure 3:
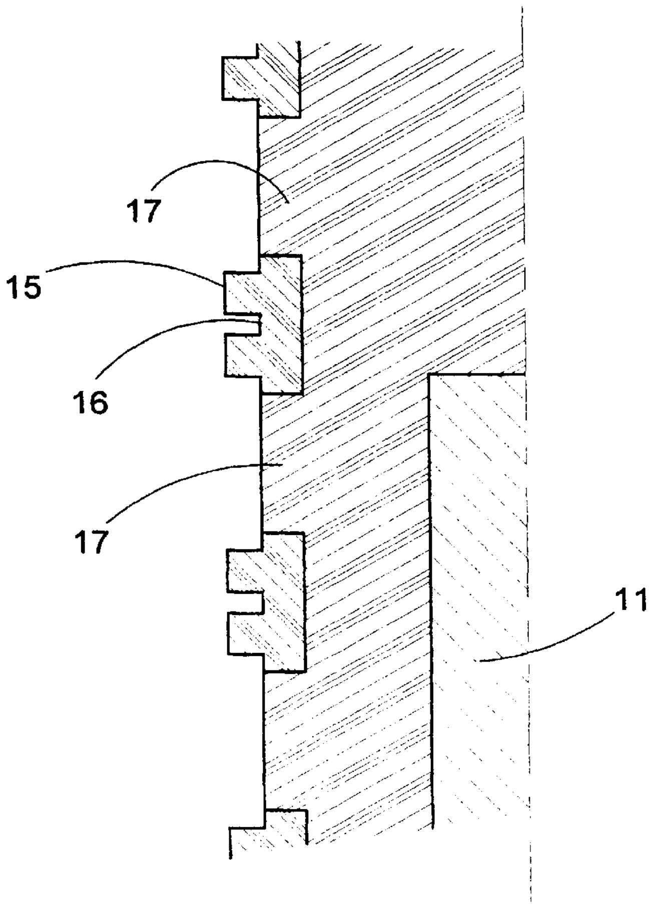

FIG. 1 shows a tool with a handle according to the invention,

FIG. 2 a detail of a gripping surface,

FIG. 3 a cross-section through the gripping surface and part of the core.

FIG. 1 shows a tool, such as a screwdriver, comprising a metal shaft part (11) for contact with a workpiece, and a handle with a top surface (12), a suspension hole (13) and a gripping surface (14). The top surface is used for exerting an axial pressure on the tool and is made with a smooth surface from a hard material, as is also the suspension hole (13) and its neighbourhood, the gripping surface (14) extends from the suspension hole essentially to the lower end of the handle.

To allow an optimal combination of tangential force transmission and sensitivity for the resistance and mobility of the workpiece within a large range of variation of torque, the gripping surface (14) is made with a structure shown in FIG. 2, comprising at pattern of raised blocks (15) of soft material, preferably squares or polygons with rounded corners, which rise to equal height from a base surface (16) of the soft material. The blocks are non-uniformly located on the surface, with groups of blocks omitted at regular intervals. Where the raised blocks are omitted, a lower block (17). Preferably square or polygon with rounded corners with essentially flat top of the harder material of the handle core protrudes to essentially the level of the base surface (16), as shown in FIG. 3.

When the tool is gripped with small torque and force, forces and sensory information is transmitted from the raised blocks (15) and the skin of the hand. When torque and force are higher, the skin will bulge into the space where raised blocks are omitted, and for the highest gripping forces, the soft material will be deformed to let a major part of the force be transmitted directly to the hard lower blocks (17).

Tools according to the invention are produced with a method, where in a first die the hard core including the lower blocks (17) is moulded around the metal shaft. In a second moulding die the core is surrounded by the soft material to form a gripping surface including the raised blocks (15) and the base surface (16). The core is preferably made from a hard thermoplastic material, if desired in multiple steps to get multiple colours, or extra high strength near the metal, or to adjust to different metal shafts. The soft gripping surface is preferably made from a thermoplastic elastomer.

What is claimed is:

1. Handle for tools, comprising a core of hard plastic material adapted to be attached around a metal shaft and a gripping surface of soft material covering parts of the core, characterized by having the core within the regions covered by the gripping surface made with a multitude of protruding lower blocks with essentially flat top, and by having the soft material filling the space between the lower blocks to essentially the same level as the top of the lower blocks to form a base surface and a multitude of blocks raised from the base surface.

2. Handle according to claim 1, the soft material being a thermoplastic elastomer.

3. Handle according to claim 1, the raised blocks being polygons with rounded corners.

4. Handle according to claim 1, the lower blocks being polygons with rounded corners.

5. Handle according to claim 1, the raised blocks forming a repetitive pattern with voids where the lower blocks protrude.

6. Handle according to claim 1, the raised blocks being squares with rounded corners.

* * * * *